United States Patent [19]

Dale et al.

[11] 4,256,609

[45] Mar. 17, 1981

[54] CATALYSTS

[75] Inventors: Robert W. Dale; John J. Rooney, both of Belfast, Northern Ireland

[73] Assignee: Gallaher Limited, Belfast, Northern Ireland

[21] Appl. No.: 4,216

[22] Filed: Jan. 17, 1979

[30] Foreign Application Priority Data

Jan. 20, 1978 [GB] United Kingdom ............ 2391/78
May 26, 1978 [GB] United Kingdom ............ 23527/78

[51] Int. Cl.$^3$ .................... B01J 29/04; B01J 21/04
[52] U.S. Cl. ...................... 252/455 Z; 252/463; 252/466 PT
[58] Field of Search ............ 252/455 Z, 463, 455 R, 252/466 PT

[56] References Cited

U.S. PATENT DOCUMENTS

| 2,865,867 | 12/1958 | Van Dyke et al. | 252/455 Z |
| 2,874,129 | 2/1959 | Bell | 252/463 X |
| 2,930,765 | 3/1960 | Cooper et al. | 252/466 PT |
| 3,033,778 | 5/1962 | Frilette | 252/455 Z |
| 3,264,208 | 8/1966 | Plank et al. | 252/455 Z |
| 3,434,479 | 3/1969 | Till et al. | 252/463 X |
| 3,657,151 | 4/1972 | Noble | 252/455 Z |

*Primary Examiner*—Carl F. Dees
*Attorney, Agent, or Firm*—Murray and Whisenhunt

[57] ABSTRACT

A catalyst is made by impregnating a highly microporous support with a solution of a substance providing catalytically active material in a mixture of water and an organic liquid that reduces the surface tension of the solution. The preferred solution contains 20 to 50% water and 50 to 80% methanol.

20 Claims, No Drawings

CATALYSTS

One of the standard ways of making a catalyst comprises depositing a substance providing a catalytically active material from solution on a support material. Often the support material is porous, in which event it is desirable to deposit the substance within the pores. The support may be macroporous, microporous, or macroporous-microporous.

The most common method of depositing a catalytically active material on a support comprise dissolving a substance providing the catalytically active material in cationic form in water and contacting the resultant solution with the support material, whereupon ion exchange occurs between the cations of the solution and cations in the support.

We are concerned primarily with catalysts for gas phase reactions and it is accepted that increased dispersion of the catalytically active material tends to increase the activity of the catalyst. Whilst the activity of many catalysts in high temperature reactions is considered to be adequate, although improvement in this may be desirable in many instances, the activity of catalyst in low temperature gas phase reactions tends to be too low for many purposes. For instance attempts have been made to devise a catalyst for the low temperature (e.g. below 100° C.) and preferably 15° to 80° C.) oxidation of carbon monoxide to carbon dioxide, for instance for incorporation in a cigarette filter, but such catalysts have been too inactive to be commercially useful.

There have been several proposals in the literature to use organic impregnating solutions. For instance lithium hydroxide is applied, in British Patent Specification No. 1,488,556 from a 90% methanol solution before applying palladium chloride solution. In U.S. Pat. No. 3,953,369 a high molecular weight surfactant is added to prevent penetration into pores of the support. In British Pat. Nos. 1,345,611 and 1,345,612 germanium chloride is introduced in alcoholic solution (presumably because of instability in water) but the final solution that is used contains only 3% alcohol. In British Pat. No. 1,464,443 organic nitrogen or phosphorus compounds are included, usually with a carboxylic acid, but presumably the support was a conventional macroporous or macroporous-microporous type of support. In U.S. Pat. No. 4,020,011 platinum and tin are deposited in Catalyst H from a 98% methanol solution, and in Catalyst D platinum is deposited from an aqueous acidic solution, apparently uniformly through the support, and tin is then deposited from an 80% methanol solution. In both these the support is alumina having a surface area of 173 g/m² and the methods are described as being suitable for supports having an average pore diameter of 50 to 300 Å. We consider this to be a typical macroporous-microporous support.

Our object has been to devise a method of impregnating highly microporous supports in such a way that much more uniform impregnation, and thus dispersion of the catalytic material, is obtained than has been conveniently possible in microporous supports by known methods of impregnating such supports. In referring to highly microporous supports we mean supports having an average pore diameter of less than 30 Å, and so substantially all the pores are below 30 Å in diameter.

A method according to the invention of making a catalyst comprises impregnating a highly microporous support material with a solution of a substance providing a catalytically active material in a mixture of water and an organic liquid that reduces the surface tension of the solution. In a particularly simple form, an aqueous methanol solution is used for contacting a zeolite or alumina support.

Preferably the amount of the organic liquid is 10 to 90% by volume of the mixture and the organic liquid should be inert to the catalytically active material, should reduce the hydrogen bonding within the solution and between the solution and the support, and should be wholly miscible with the water in the solution. Often it is preferred that it should have molecular dimensions smaller than the pore size of the support material. Preferred organic liquids are selected from alcohols and cyclic ethers, most preferably being selected from tetrahydrofuran, methanol, ethanol, dioxan and furan. The liquid is generally aliphatic or alicyclic. Preferably the solvent in the solution consists of 20 to 50% water and 50 to 80% of the organic liquid.

The support material will generally have an average pore diameter of below 30 Å. Its surface area is normally above 300 g/m² and preferably is above 400, e.g. 450 g/m² or more. Preferred supports in the invention have a surface area of 450 to 800 m²/g.

Due to the small pore size of the support, the organic liquid must also have small molecular size, in order that the solution can migrate into the pores. It appears that the reduction in surface tension, and reduction in hydrogen bonding, is in some way related to the Hammett Acidity Function theory. Under this the acidity of a mixture of water and certain organic liquids varies according to the proportions of the liquids, generally being highest with pure organic liquid and pure water and lowest with certain mixtures in between. In the invention best results are obtained when the Hammett Acidity of the aqueous mixture is near the minimum possible value.

The organic liquid must not react with the substance that is dissolved in the solution. In some instances it may be found that, for instance, ethanol might react with a platinum containing substance, in which event ethanol should be avoided as the organic liquid for that solution. Methanol however is satisfactory for platinum substances. Suitable solvent mixtures can be found by routine experimentation. Preferably they are such as to reduce the surface tension of the solution from the value of 73 dynes per cm at 25° C. (for pure water) to a value of from 20 to 30 dynes per cm at 25° C.

Best results are obtained when the catalytically active material is deposited in the micropores as a result of being physically absorbed onto the support material, instead of being deposited by ion exchange. In fact the use of an organic solvent when deposition is by ion exchange may tend to reduce the activity of the catalyst.

Physical adsorption of the catalytically active material into the micropores can best be obtained by maintaining the solution in contact with the support material whilst some at least of the solvent evaporates. For instance contact may be maintained whilst at least 50%, and in some instances even 100%, of the solvent evaporates. Preferably the contact between the solution and the support is conducted over a prolonged period, e.g. at least 6 hours and usually at least 10 hours, so as to give optimum time for metal to be deposited within the pores.

The solution may initially have a concentration or catalytically active material ranging from a trace to quite high percentages, but preferably contains less than 2.5% based on the weight of the support. In particular the concentration is generally less than 0.2% and preferably less than 0.1%, of the catalytically active material. Best results are obtained with about 0.01 to 0.10% of the metal (e.g. about 750 parts per million metal). If the solution is too concentrated there seems to be a tendency for it to deposit the catalytically active metal on the external surface and not substantially within the pores.

After depositing the catalytically active material from solution it is generally necessary to reduce it before use. Whilst reduction can be conducted with any reducing gas including hydrogen or hydrogen carbon monoxide mixtures, or with an organic reducing, e.g. formaldehyde, best results are obtained if reduction is with carbon monoxide, preferably substantially pure. Reduction is preferably at a temperature of 100° to 450° C., most preferably 300° to 400° C.

The catalytically active material is preferably a metal that is a transition metal, most preferably of groups 6, 7 and 8 of the Periodic Table. Preferred metals are Fe, Co, Ni, Ru, Rh, Pd, Os, Ir, Pt, Cr, Mo, Re and W.

Particularly preferred for low temperature oxidation of carbon monoxide to carbon dioxide are catalysts containing platinum, palladium, rhodium, rhenium and tin and nickel (although nickel catalyst may be more suitable for industrial uses of the catalysts than in smoking products). Mixtures of metals are often useful, especially mixtures of platinum or palladium with rhodium, rhenium or tin. Especially preferred are catalysts based on platinum, palladium, rhodium, rhodium mixed with palladium or any of these together with tin. Whilst the palladium or platinum are generally present in metallic form the tin may be present as stannous oxide. Such catalyst have particularly stable activity in the presence of moisture.

Catalysts containing two or more metals may be made by contacting the powdered support with a solution containing compounds of both metals or by contacting the powdered support sequentially with solutions of different metal compounds.

The total amount of catalytic metal on the support is preferably from 0.1 to 5%, most preferably 0.5 to 2%.

Compounds that provide the catalytic material in the desired anionic form are readily available. For instance when the catalytic material is to be platinum or a compound of platinum chloroplatinic acid can be used as the source of platinum.

The support material may be any support material having a microporous structure and suitable for use as a catalyst either in low temperature or high temperature processes. Generally it will be a refractory material. It may be, for instance, carbon, e.g. coconut charcoal. Other suitable materials include alumina, siica, titania, magnesia, zirconia, and silico-aluminates. An example of an aluminium silicate clay that can be used is montomorillonite. Preferably however the support material is a zeolite. The zeolite may be, for example, a zeolite of the A, X or Y series with best results generally being obtained with the A and X series. Preferred support materials are zeolite 3A, 4A, 5A, 10X and 13X with zeolite 13X, 4A and 5A being preferred. The support material may be utilised in the form of pellets, for example containing a clay binder and having a particle size of 1.3 to 3 mm, or in the form of powder, for example less than 0.1 mm, most preferably less than 50 microns.

It is particularly preferred that the microporous support material into which the substance is physically adsorbed should be one that has been activated by creating a deficiency of hydroxyl groups in its surfaces. Methods of doing this are described in our copending application Ser. No. 4,277 to which reference should be made for full details. Broadly the methods generally comprise heating powder support material or by crushing pellets of a support material such as zeolite or alumina and which have generally been made by calcination. Generally activation is achieved by heating either powder or material that is being pelleted to a temperature at least 20° C. above the temperature at which chemisorbed water is substantially driven off.

Thus the support that is to be impregnated may be in the form of powder obtained by crushing pellets so as to generate active surfaces or may be in the form of powder, for example less than 0.1 mm and preferably less than 50 microns, that has been heated in this form to generate the active surfaces. Most preferably the particle sizes of the powder, especially when it is being heated to activate it, is from 5 to 15 microns. The powder particles, whether produced by crushing or that are heated, preferably have a substantially uniform diameter, for example with substantially none of the particles having a diameter more than 3 times the diameter of a significant proportion of any of the other particles. If crushing produces over size particles they are preferably sieved away and rejected.

Although it is necessary to activate the support material on which the catalytic substance is actually deposited it is of course possible for this support material itself to be carried by a second support material, in which event this second support material of course may not have to be activated in this manner. For instance the final catalyst made by the invention may comprise catalytic substance deposited on, for instance, alumina that has been activated in the described manner and which itself is present as a coating on a honeycomb or other macroporous refractory material which serves as the second support. This refractory material may be a ceramic substance or a metal support, for example stainless steel.

Many catalysts made according to the invention are of value for low temperature oxidation of carbon monoxide to carbon dioxide, for example in the oxidation of stack gases or in motor car or other engine exhausts (especially when carried on a refractory macroporous support) but they are of particular value distributed through smoking products or included in a filter for a smoking product. Preferably they are included in a filter. The filter may be a triple filter, with catalytic powder, either by itself or mixed with absorbents such as granular carbon, in a central component between fibrous end portions. The powder may be loose or may be bonded into a porous plug. The powder may also be bonded to fibres that form the central portion of a triple filter or that are distributed throughout some or all of any filter construction or may be bonded to a sheet which is crumpled or spirally wound to form part or all of a filter.

The following are examples of the invention. In each of Examples 1, 2, 3 and 4 zeolite 13X pellets were used, different commerical grades of zeolite 13X being used in each of the four examples. In each instance the pellets were ground in a domestic grinder and were sieved to leave a fraction having a particle size of 30 to 60 mesh. In Example 5 zeolite 4A powder was used.

In each instance the powder was mixed with an impregnating solution containing sufficient chloroplatinic acid solution (5% w/v) to give a total pick-up of platinum of 0.5% onto the catalyst. The mixture was left for 12 hours at about 40° C. by which time the solution had evaporated to dryness to leave a free flowing powder. As shown in the Table below, the solvent for the solution consisted of water or various mixtures of water and methanol.

After drying each catalyst was reduced by carbonmonoxide and its activity in converting carbonmonoxide to carbondioxide was determined by forming a gas mixture of 3% CO, 10% $CO_2$, 13% $O_2$ and 74% $N_2$ and puffing this over 500 mg of the catalyst and analysing the resultant gas mixture, each puff constituting 35 ml of the gas mixture at atmospheric pressure and being passed for 2 seconds over the catalyst at the rate of 1 puff per minute. The degree of conversion in the first 10 puffs, and sometimes also in the second 10 puffs was recorded. Naturally the highest possible degree of conversion is desirable, 100% being optimum. The following results were obtained.

| Example | Zeolite | Volume of Solution (ml) | Composition of Solvent | Activity 1st 10 puffs | Activity 2nd 10 puffs |
|---|---|---|---|---|---|
| 1A | 13X | 20 | 100% $H_2O$ | 64 | — |
| 1B | 13X | 20 | 50% $H_2O$/50% MeoH | 95 | 70 |
| 2A | 13X | 20 | 100% $H_2O$ | 82 | 59 |
| 2B | 13X | 20 | 50% $H_2O$/50% MeoH | 100 | 71 |
| 3A | 13X | 5 | 100% $H_2O$ | 75 | — |
| 3B | 13X | 10 | 50% $H_2O$/50% MeoH | 100 | 73 |
| 4A | 13X | 20 | 85% $H_2O$/15% MeoH | 93 | — |
| 4B | 13X | 20 | 50% $H_2O$/50% MeoH | 100 | 70 |
| 4C | 13X | 20 | 30% $H_2O$/70% MeoH | 94 | 76 |
| 4D | 13X | 20 | 20% $H_2O$/80% MeoH | 100 | 70 |
| 4E | 13X | 20 | 100% MeoH | 81 | — |
| 5A | 4A | — | 100% $H_2O$ | 45 | — |
| 5B | 4A | — | 50% $H_2O$/50% MeoH | 88 | — |

We claim:

1. A method of making a catalyst comprising physically adsorbing a substance providing a catalytically active metal selected from the group consisting of groups 6, 7, and 8 of the Periodic Table into a microporous support having an average pore diameter less than 30 Å by contacting the support with a solution of the substance in a solvent which is a mixture of water and an organic liquid which reduces the surface tension of the solution and which is inert to said substance, and evaporating at least some of the solvent and thereby depositing the said substance in the micropores.

2. A method according to claim 1 in which the average pore diameter is below 16 Å.

3. A method according to claim 1 in which the support material is zeolite or alumina.

4. A method according to claim 1 in which the catalytically active material is selected from platinum, palladium and rhodium.

5. A method according to claim 1 in which the catalytically active material is present in the solution in anionic form.

6. A method according to claim 1 in which the solvent in the solution consists of 20 to 50% water and 50 to 80 of the organic liquid.

7. A method according to claim 6 in which the organic liquid is methanol.

8. A method according to claim 1 in which the amount of the organic liquid is 10 to 90% by volume of the mixture and the organic liquid is inert to the catalytically active material, reduces the hydrogen bonding within the solution and between the solution and the support material and is wholly miscible with the water in the solution.

9. A method according to claim 8 in which the organic liquid is an alcohol or cyclic ether.

10. A method according to claim 8 in which the organic liquid is selected from tetrahydrofuran, methanol, ethanol, dioxan and furan.

11. A method according to claim 1 in which the support has a surface area of above 400 $m^2/g$.

12. A method according to claim 1 in which the support material has been activated by generating on its surfaces having a deficiency of hydroxyl groups.

13. A method according to claim 1 in which the substance is subsequently reduced by carbonmonoxide.

14. A catalyst made by a method according to claim 1.

15. A method according to claim 1 in which the amount of solvent that is evaporated is at least 50% by volume of the amount of solution that is contacted with the support and the amount of the said substance present in the solution that is contacted with the support is less than about 2.5%, calculated as the metal, based on the weight of the support.

16. A method according to claim 1 in which the initial concentration of the substance in the solution is from 0.01 to 0.2% by weight catalytic metal.

17. A method according to claim 1 in which substantially all the solvent is evaporated.

18. A method according to claim 1 in which the evaporation is continued for a period of at least 10 hours.

19. In a process for making a catalyst comprising depositing on a porous refractory support material a solution of a substance providing a catalytically active metallic material comprising a metal of groups 6, 7 or 8 of the Periodic Table and converting said substance to said catalytically active metallic material, the improvement comprising making a more active catalyst by using a microporous support material having an average pore diameter of less than 30 Å and physically adsorbing a solution of said substance in a mixture of water and 10 to 90% by volume of an inert organic liquid selected from the group comprising tetrahydrofuran, methanol, ethanol, dioxan and furan into said support material and evaporating at least 50% by volume of solvent, based on the volume of said solution, to thereby deposit said substance in the micropores of said support material.

20. Process of claim 19, wherein said metal is a noble metal.

* * * * *